July 21, 1953     O. R. HAAS     2,646,013
MACHINE FOR MAKING HASSOCKS
Filed Sept. 19, 1947     4 Sheets-Sheet 1

Inventor
Otto R. Haas
By his Attorney

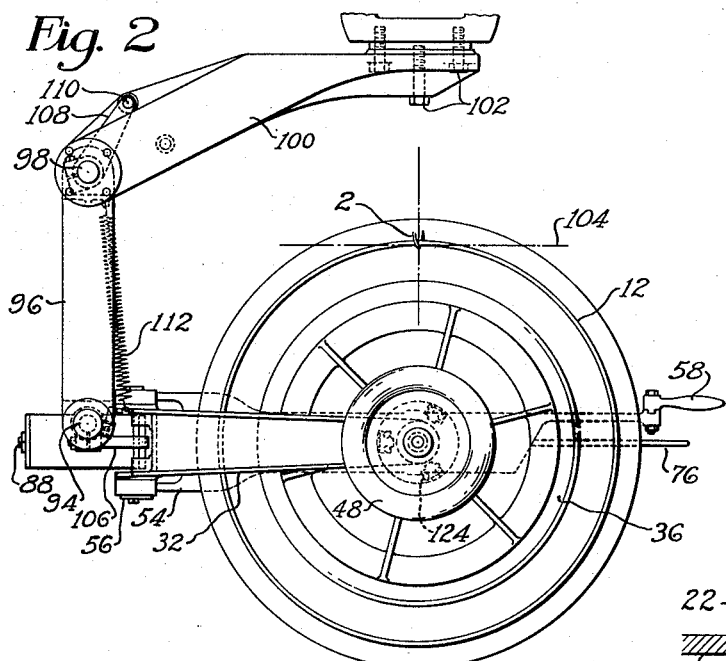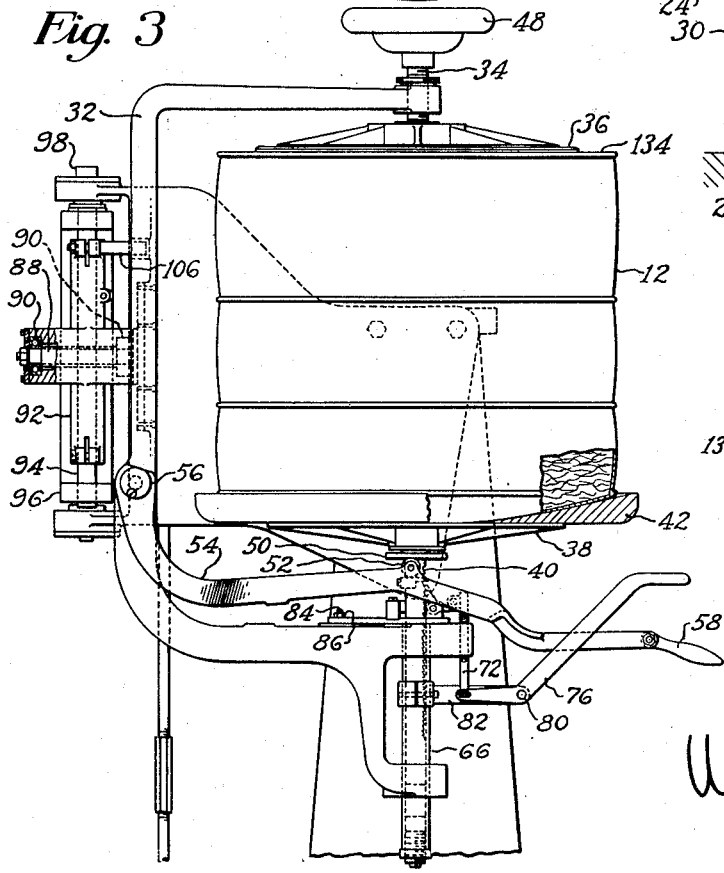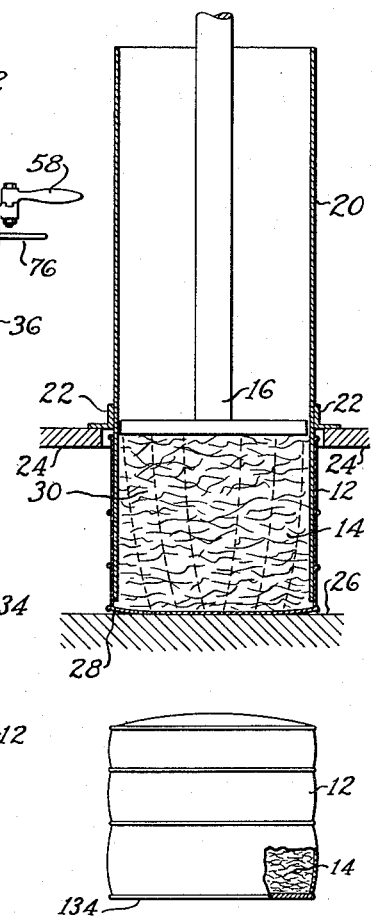

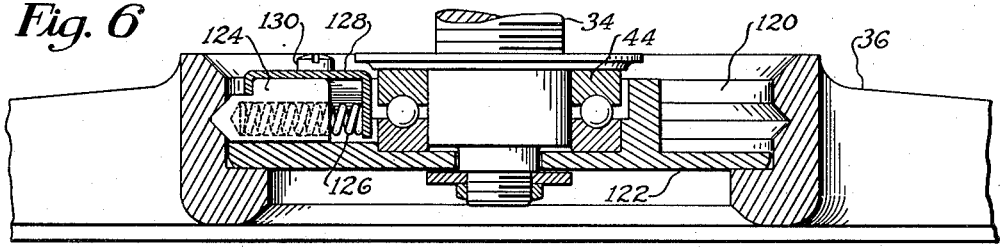
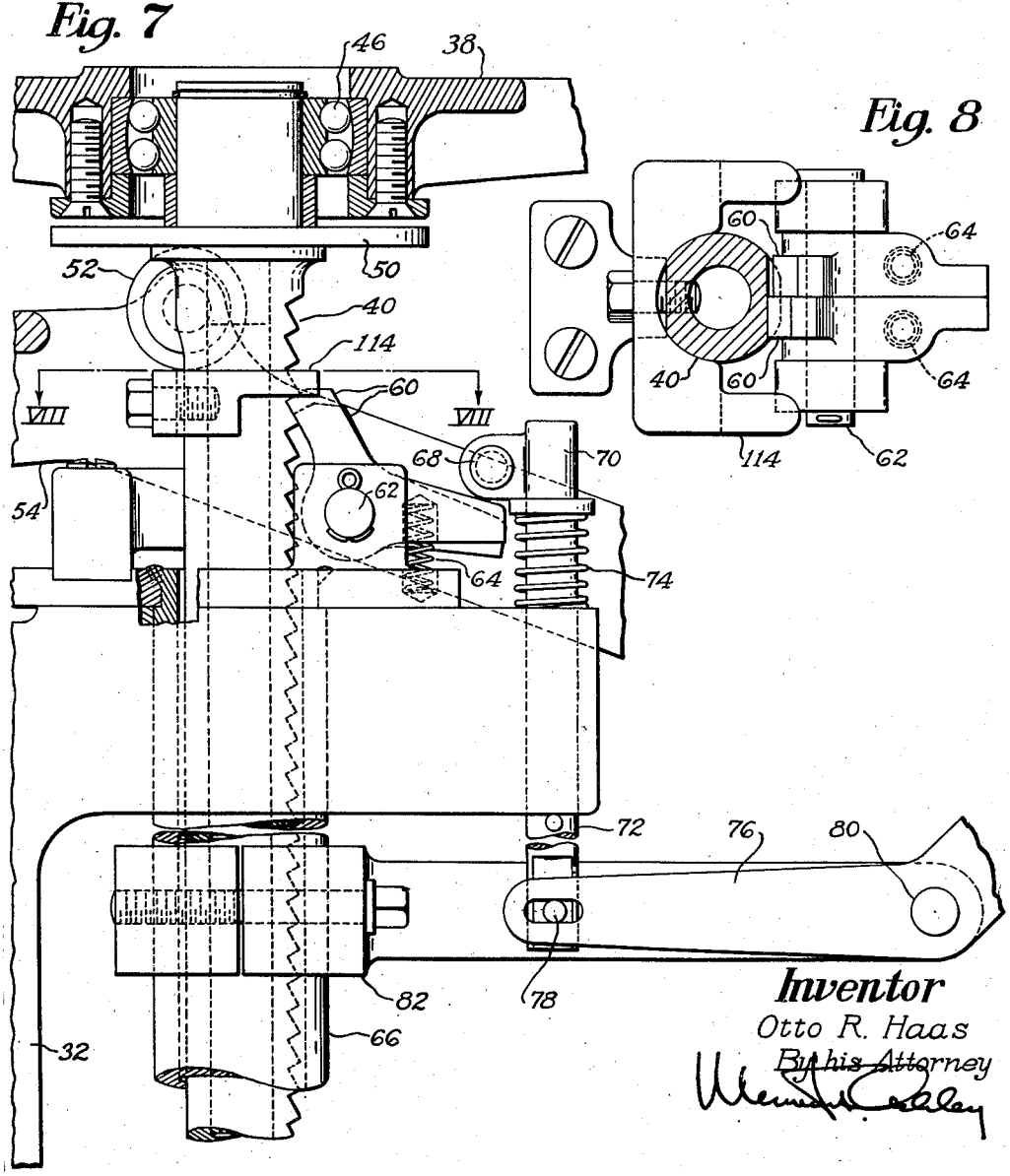

July 21, 1953  O. R. HAAS  2,646,013
MACHINE FOR MAKING HASSOCKS
Filed Sept. 19, 1947  4 Sheets-Sheet 4
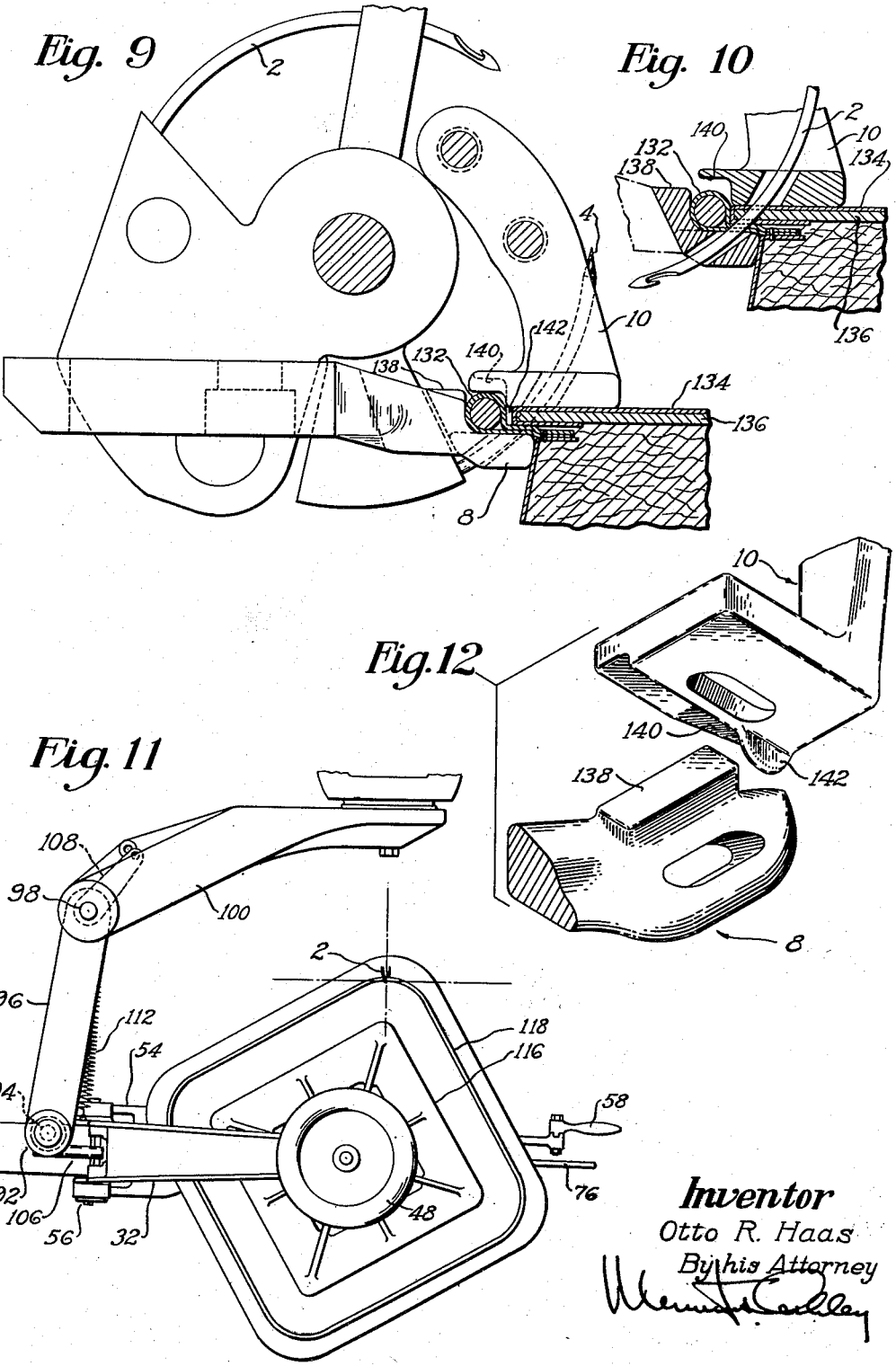
Inventor
Otto R. Haas
By his Attorney Patented July 21, 1953

2,646,013

UNITED STATES PATENT OFFICE 2,646,013

MACHINE FOR MAKING HASSOCKS

Otto R. Haas, Wenham, Mass., assignor to United Shoe Machinery Corporation, Flemington, N. J., a corporation of New Jersey Application September 19, 1947, Serial No. 774,943

6 Claims. (Cl. 112—2)

The present invention relates to novel machines for fastening the marginal edges of a tubular casing for hassocks or similar cushions with a continuous seam after being filled with stuffing material.

In the manufacture of hassocks and household cushions it is common practice to provide a flexible casing with an open end filled with heavily compressed stuffing material. To complete the hassock after filling the casing, the casing is tensioned about the stuffing material while fastening the final casing closure, which also is flexible, thus confining the stuffing material under compression, and insuring a plump well-filled appearance during subsequent use of the hassock.

One difficulty with this method of manufacture arises from the lack of uniformity in compressibility of the stuffing material employed so that the sizes of successive hassocks manufactured by this method may vary substantially, one from another. A hassock casing of known volume is easily constructed but in filling the casing with stuffing material it is essential for acceptable results to compress it into a coherent wad so that permanent deformation of the casing will not occur in later use of the completed hassock. If cotton or other fibrous filling is employed, it is usual to compress it at least to one-third of its original loose volume. This is most readily accomplished after the stuffing material is placed within the casing by confining the stuffing material against expansion in the direction of the side walls of the casing while forcing the material into a compact mass by pressure exerted in a direction endwise of the casing. This pressure may range as high as seven tons for a hassock two feet in diameter or in the neighborhood of 30 pounds per square inch. With such pressure it is impossible to determine beforehand the exact volume of the finally compressed stuffing material. Accordingly, an amount of stuffing material less than required to fill the casing after compression is ordinarily employed and an excess amount of loose uncompressed material is then added to the casing after the main bulk has been compressed. Since the compression of the stuffing material first inserted in the casing is accomplished in a heavy cumbersome press it is impractical economically to apply further pressure for reducing the volume of uncompressed material by trial and error to exactly the proper amount. Furthermore, the operation of fastening the final flexible closure to the open end of the casing is a slow, painstaking operation and since it is impossible to compress the stuffing material in a large hassock manually with uniformity over an extended area while fastening the final closure, it is also impossible, according to prior practice, to bring a flexible closure of fixed size into securely tightened relation to a casing surrounding a fixed volume of highly compressed stuffing material in a manner to produce a hassock of uniformly well-filled appearance.

To insure a completely filled hassock casing, the final flexible closure of which is fastened with proper tension it has been customary heretofore for a hassock manufacturer, after having nearly filled the open end of a casing with highly compressed stuffing material, to add manually that amount of uncompressed stuffing material which will create a bulging surface on the final flexible closure portion of the casing, preferably at the bottom end of the hassock where unavoidable irregularities in shape of the closure as well as slight variations in the degree of tension will be least apparent. With a bulging surface at the bottom of a hassock filled with uncompressed stuffing material this material soon becomes flattened by compression when the hassock is set upon the floor but flattening may loosen the casing unless by reason of considerable skill obtained from long experience the exact amount of uncompressed stuffing material has been employed exactly to offset the compression of the bulge in the bottom end closure.

Objects of the present invention are to provide a machine for manufacturing hassocks of the type referred to in which a flexible bottom end closure may be fastened with a continuous seam along the edges of the flexible tubular side wall and end closure of a hassock casing when the casing is completely filled with heavily compressed stuffing material, the stuffing material being held over an extended area against expansion during fastening so that the flexible end closure may be applied in flattened condition without bulging or other forms of irregularity. Other objects are to simplify and improve machines for manufacturing hassocks in such a way that an improved form of hassock will be produced without the exercise of special skill or ability on the part of the operator of the machine.

In accordance with these objects the illustrative machine of the present invention is arranged to fasten the flexible end closure of a hassock and is provided with a fixed bracket, a hassock support having two vertically disposed hinge mountings on the bracket and clamping means in the support for holding the stuffing material within the hassock from endwise expansion so that the entire length of unfastened edge about the flexible end closure may be brought into uniform alinement with the edges of the side walls before the continuous fastening operation is started. After the fastening operation is completed and the clamping means is released the stuffing material in the hassock will expand endwise uniformly a slight amount to fill the entire space within the flexible casing, so that an extremely uniform appearance is produced in a series of hassocks sewed on the machine.

These and other features of the invention as hereinafter described and claimed will be apparent from the following detail specification taken in connection with the accompanying drawings in which, Fig. 1 is a view in side elevation looking from the left of a hassock fastening machine embodying the features of the present invention;

Fig. 2 is a detail plan view of the support for the hassock and its mounting on the machine illustrated in Fig. 1;

Fig. 3 is a view in front elevation of the hassock support illustrating its clamping means;

Fig. 4 is a sectional detail view of a portion of a press employed to compress the stuffing material within a hassock casing;

Fig. 5 is a side elevation on a reduced scale of a completed hassock constructed on the machine of Fig. 1 according to the method of the present invention;

Fig. 6 is a detail sectional view on an enlarged scale of a portion of the bottom end closure clamping plate employed in the machine of Fig. 1;

Fig. 7 is a sectional view of the hassock raising and clamping mechanism employed in the machine;

Fig. 8 is a sectional view of the clamping mechanism taken along the line VIII—VIII of Fig. 7;

Fig. 9 is a detail view on an enlarged scale of the stitch forming and work clamping devices of the machine illustrating their manner of operation;

Fig. 10 is a further detail view partly in section showing a modified form of presser foot for the machine;

Fig. 11 is a view similar to Fig. 2 illustrating a modified form of support for a hassock; and Fig. 12 is a separated perspective view on an enlarged scale of the work support and presser foot illustrated in Fig. 9.

Figure 1:
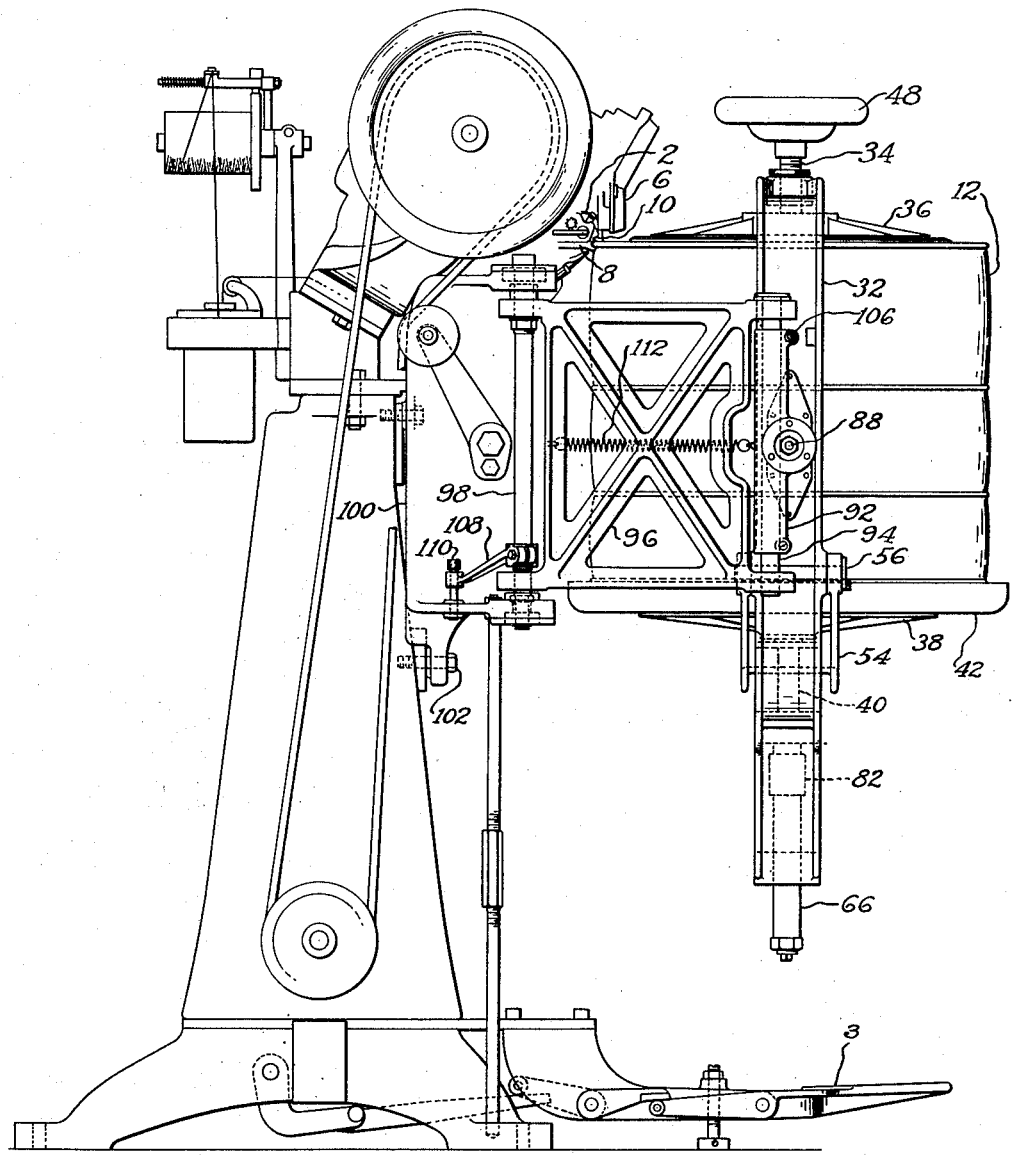

The fastening machine illustrated in the drawings is a curved hook needle lockstitch sewing machine similar to that disclosed in the United States Letters Patent No. 1,169,909, granted February 1, 1916, upon application of Fred Ashworth and No. 2,271,611, granted February 3, 1942, upon application of Fred Ashworth and Carl A. Whitaker. The machine is provided with a support arranged to maintain a hassock at a convenient elevation for easy presentation of the corner edges of a flexible hassock casing to the stitch forming devices in the machine. In order to facilitate the presentation of the hassock to the machine, the sewing head of the machine is tilted on the supporting column from the position shown in the patents through an angle of approximately 30° and the operation is controlled by a starting and stopping treadle 3 actuated through a system of levers extending forwardly beneath the hassock support into an accessible position at the front of the support.

Referring more particularly to Fig. 1 of the drawings, the stitch forming devices of the machine insert a continuous line of thread fastenings between the flexible side walls of the casing and the flexible bottom end closure and are of the usual lockstitch type, including the curved hook needle indicated at 2, a curved awl 4, and a shuttle 6. To secure the parts operated upon while each stitch is inserted, the machine is provided with a work support 8 and a presser foot 10.

In the construction of a hassock according to prior methods a casing of flexible leather or coated fabric having the bottom end open and the top end closed is filled with stuffing such as cotton, hair, wool, excelsior or other material. In Figs. 4 and 5 the flexible casing is indicated at 12 and the stuffing material at 14, the top end of the hassock being disposed lowermost. The stuffing material is introduced into the open end of the casing 12 and compressed to such an extent while within the casing that there will be no possibility of further permanent compression during use of the completed hassock. For this purpose the stuffing material is acted upon in a hydraulic press, the plunger portion of which is indicated at 16 in Fig. 4. The pressure exerted by the press is sufficient to compress the stuffing material into a volume less than one-third of that in its original loose condition. Such pressure produces a permanent deformation of the stuffing material and is followed by a comparatively small expansion as the pressure is relieved.

For convenience in operation of the press the plunger 16 is arranged to act in a direction endwise of the hassock. To provide a guide for the filling compressing plunger and to prevent expansion of the stuffing material in the direction of the side wall of the casing during action of the press, a heavy tube 20 of a size slightly smaller than the hassock casing 12 is inserted within the casing and mounted in alinement with the plunger. The tube is at least three times as long as the hassock casing and is supported by ears 22 secured to the tube resting on a frame 24. The location of the ears on the tube is such that the lower end of the tube carrying the top end of the casing is supported approximately 2" from a flat base 26 which may be provided by a factory floor. When the press is actuated after filling the guide tube the stuffing material is squeezed within the hassock casing into a compact mass with the fibers composing the stuffing material extending in horizontal striations. Thus, the greatest pressure is exerted downwardly against the surface of the floor. The hassock casing fitted over the tube 20 has its flexible top end closure, indicated at 28, bulged outwardly and flattened along the floor against its central area while being formed into a gradual curvature along its outer marginal portions. As illustrated in Fig. 4 the dotted lines 30 indicate zones of equal pressure in the stuffing material, the greatest pressures being exerted on the central area of the end closure 28 while the outer edges of the end closure are subject to reduced pressures to impart a gradually increasing bulge toward the outer edge of the end closure.

After the plunger 16 is withdrawn from the tube 20 the stuffing material expands slightly but not in any degree equal to that of the loose stuffing material in its original uncompressed volume. According to prior methods of hassock manufacture, the amount of filling employed is proportioned to give a compressed volume slightly less than that required to fill the casing 12 completely. After permanent compression of the stuffing material the tube 20 is lifted from the frame 24 and is removed from the casing by forcing the wad of compressed stuffing material out of the tube, the casing sliding off the tube simultaneously. To complete the hassock a flexible end closure for the bottom is fastened to the edges of the casing 12.

In order to insure a plump well-stuffed condition in the completed hassock according to prior manufacturing procedures an amount of uncompressed stuffing material is introduced into the guide tube 20 somewhat less than required to fill the casing. To completely fill the casing after compression of the stuffing material it is then necessary to add loose material to the open end of the casing until the open end is well rounded. The upper edge of the flexible casing side wall and a flexible end closure are then presented to a sewing machine and a few stitches inserted passing through the parts. The sewing is then stopped and the end closure piece is pressed down manually along its central area to force the loose filling beneath the sewed section of the end closure. In so doing the sewed section is caused to round out along the juncture of the side walls and end closure in a way to avoid the presence of a definite angle between the parts. The edge of the closure member is then pulled down manually against the edge of the side wall in advance of the sewing point and a few more stitches inserted. Sufficient tension is given to the end closure along its edges while inserting each group of stitches to press the loose filling securely in place. The operation is continued until the entire length of the casing edge is fastened to the end closure, the end closure being folded inside the casing to an extent determined by the compression of loose stuffing material. Thus, the size of the end closure is regulated by the extent of bulge caused by the loose stuffing material added to the hassock casing after the main bulk of the material has been compressed permanently. With an extremely large bulge less of the end closure is folded inside the casing and with a relatively small bulge in the stuffing material more of the end closure is folded inside the casing. Since it is expected that the added loose stuffing material later will be compressed permanently during use of the hassock the bottom end closure of the casing itself may become loosened and wrinkled in a manner to present an unsightly appearance. The unsightliness of the hassock is minimized, however, by the fact that the looseness and wrinkles form in or near the bottom where they are less conspicuous than elsewhere.

According to the present improved machine for manufacturing hassocks the use of loose stuffing material to be added manually to a casing incompletely filled with permanently compressed stuffing material is avoided and it is possible to fill a flexible hassock casing completely with a wad of compressed stuffing material having a desirable shape, the bulging bottom being eliminated. The hassock constructed with the machine of the present invention is filled throughout its entire flexible casing with a single wad of stuffing material permanently compressed uniformly to occupy a volume slightly in excess of the capacity of the tubular side wall of the casing, a bulge being provided along the flexible top end closure of the hassock in the usual manner and the flexible bottom end closure of the hassock engaging a permanently flat surface of the compressed stuffing material and being fastened to the side walls of the casing along the line defining the flat bottom surface of the stuffing material wad. To force the slight excess volume of the stuffing material into the confines of the casing the wad of stuffing material is compressed insufficiently to cause permanent deformation and held while the bottom closure is made fast. Since the entire wad has already been heavily compressed no further compression of the stuffing material will occur during use of the hassock. The flexible casing for the hassock will, therefore, maintain its tension and shape indefinitely while in use. These results are rendered possible by the use of the machine of the present invention in which the compressed stuffing material is held from endwise expansion in a movable support including clamping means acting over an extended area of the hassock bottom to prevent endwise expansion or bulging while the flexible bottom end closure is sewed to the flexible side walls of the hassock casing. By holding the stuffing material under a moderate clamping pressure evenly distributed along the end surfaces, the bottom end closure may have all its edges brought simultaneously into close fitting uniform alinement with the edges of the side walls while the bottom end closure is maintained in a flattened condition so that with a given size of casing side wall a definite size of bottom end closure may be employed, no folding under along the edges of the bottom end closure or bulging being necessary as required by prior methods of hassock construction.

The clamping means for holding the stuffing material of a hassock compressed on the support while fastening the final end wall closure and for preventing endwise expansion comprises a C-shaped member 32, best shown in Fig. 3 and is pivotally mounted on the support for the hassock. The clamping member embraces opposite ends of the hassock and supports the hassock in fixed relation to the stitch forming devices of the machine with freedom for movement as the sewing operation progresses. To distribute the pressure uniformly over an extended area in the central portion of the flat hassock bottom the upper arm of the clamping member is threaded to receive a jack screw 34 rotatably supporting at its lower end a circular plate 36 having its lowermost surface finished to lie within a single flat plane and its central portion provided with reinforcing ribs for structural rigidity. To engage the top end of the hassock which is presented to the clamping member in an upside-down position a similar plate 38 is mounted for rotation on a rack bar 40 slidably mounted in spaced bearing portions of the clamping member 32. The plate 38 has fastened to it a form 42 provided with a dished upper surface fitting the bulging top end of the hassock. The plates 36 and 38 are connected to the jack screw and rack bar respectively by anti-friction bearings 44 and 46 (see Figs. 6 and 7), so that the hassock is free to rotate as the sewing operation progresses about the bottom end of the hassock.

The jack screw 34 is provided with a hand wheel 48 to enable convenient vertical adjustment of the plate 36 to a position determined by the height of the work support and presser foot on the machine. To clamp and release a hassock the rack bar has secured to it a disc 50 just beneath the plate 38 and against the underside of the disc is pressed a pair of rolls 52 rotatably mounted at either side of an opening in a clamping lever 54 fulcrumed at 56 on the clamping member 32. The forward end of the lever 54 is provided with a handle 58 for raising and lowering the plate 38 toward and from clamping relation with the hassock. To secure the plate in clamping relation with a hassock the rack bar is engaged by a pair of pawls 60 of slightly different lengths pivotally mounted on a pin 62 and acted upon by a pair of compression springs 64 retained within recesses in the pawls and the flange of a sleeve 66 surrounding the rack bar and forming a sliding bearing therefor.

To release the pawls from engagement with the rack bar the pawls have outwardly extending arms engaged by a horizontal pin 68 carried by a block 70 on the upper end of a shaft 72 slidably mounted in a vertical opening through the lower portion of the clamp 32. The shaft 72 is held in raised position out of engagement with the pawl 60 by a spring 74 coiled around the shaft 72 between the block 70 and the portion of the clamping member through which the shaft passes. To actuate the pin 68 against the pawls 60 the lower end of the shaft 72 is flattened to enter a space in the bifurcated end of a pawl releasing lever 76 slotted to receive a cross pin 78 passing through the shaft 72. The lever 76 is fulcrumed at 80 on the forwardly extending arm of a clamp collar 82 secured to the sleeve 66. The forward end of the releasing lever 76 extends above and to the left of the clamping lever 58 in a position convenient for operation. To secure the sleeve 66 against rotation the flange of the sleeve has a rearwardly extending portion through which passes a stud 84 threaded into the clamp 32 and provided with a nut 86.

To limit the upward movement of the rack bar 40 and to force the rack bar to move downwardly whenever the clamping lever 54 is depressed after releasing a hassock the rack bar has bolted to it a block 114 (see Fig. 8) formed with a central recess surrounding the rack bar and provided with forwardly projecting fingers engaging the undersides of the rolls 52.

The clamping member 32 is carried on the support for the hassock mounted for swinging movement of the upper end which is operated upon, toward and from the stitch forming devices and for bodily movement in the direction of the line of the seam inserted by the stitch forming devices to enable irregularly shaped hassocks to be sewn with the same convenience as hassocks of circular shape. To support the clamping member 32 for bodily swinging movement of a hassock toward and from the stitch forming devices the clamping member is rotatable about a horizontal pivot and also about a pair of spaced vertical pivots comprising hinge mountings. The horizontal pivot for the clamping member consists of a shaft 88 projecting from the central portion of the clamping member carrying anti-friction bearings 90 mounted within a horizontal sleeve portion of a vertical tubular member 92 clamped in turn to a spindle 94, the ends of which are mounted in bearings carried by a transversely braced gate-like support arm 96. The arm 96 is in turn secured to a vertical spindle 98 rotatably mounted in bearings carried by outwardly extending arms of a fixed support bracket 100 bolted at 102 to the front surface of the main column of the machine. Swinging movement of the arm 96 about the bearings in the bracket 100 causes bodily movement of the hassock and clamping member 32 in the direction of the line 104 of the seam (see Fig. 2). Swinging movement of the clamping member about the shaft 88 or about the hinge spindle 94 as centers moves the uppermost edge of the hassock toward and from the stitch forming devices to press the hassock against the stitch forming devices or disengage the hassock therefrom.

To limit the swinging movements of the hassock clamping member 32 the sleeve 92 has projecting at right angles from its upper end a stop rod 106 entering loosely within an opening of the clamping member 32 and the spindle 98 has clamped to it an arm 108 provided at its outer end with a sliding lock pin 110 arranged to fit within an opening in the bracket 100. The stop rod 106 limits the rotary movement of the clamp about the shaft 88 as a center. To assist in holding the hassock in sewing position the clamping member 32 has stretched between its central portion and a rearward strut of the arm 96 a tension spring 112 acting to swing the clamping member rearwardly of the machine.

For sewing hassocks of cylindrical shape a pressure plate 36 of circular form similar to the one indicated in Fig. 2 is employed. For sewing rectangular hassocks a straight sided pressure plate 116 is substituted for the circular one 36. This plate is shown in Fig. 11 and engages an extended area at the central bottom end portion of a rectangular hassock 118 leaving a space around the margin of the correspondingly shaped bottom end closure of the hassock for operation of the stitch forming devices.

To provide convenient means for removing and replacing a pressure plate quickly, each plate has a central shouldered opening 120 shown in Fig. 6. Fitting within the opening against the shoulder therein is a flanged disc 122 within the flange of which is secured the bearing 44. Mounted on the disc 122 is a series of horizontally releasable sliding detents 124 spaced at intervals of 120° apart as illustrated in Fig. 2. Each detent has a wedge-shaped outer end fitting a groove within the opening 120 and a passage to receive a compression spring 126 acting against the detent at one end and against a downwardly extending arm of a retaining piece 128 secured to upstanding lugs on the disc 122 by screws 130. The detents are so arranged that when downward pressure is exerted on a pressure plate the detents will be forced toward each other to release the pressure plate. A new pressure plate of different shape may be substituted for the one removed merely by inserting the disc within the opening of a plate and engaging the detents with the groove of the new plate.

In order to guide the upstanding edge of the hassock casing side wall and a stiffened edge of the bottom end closure at the sewing point, the work support 8 and the presser foot 10 are shaped especially to receive between them the parts operated upon and to deflect the marginal portion along the side edge against the substantially undeformed edge of the bottom end closure. In the form of hassock illustrated the tubular side wall margin of the hassock casing has fastened near its upper edge a beaded welt 132 and the bottom end closure, indicated at 134, comprises a sheet of coated fabric cemented to a stiffener 136 of a size to fit snugly within the bead of the welt 132. Where an extremely snug fit is obtained between the bottom end closure and the bead on the welt the work support is provided with a back gage block portion 138 and the presser foot is recessed along its rearward edge at 140, as shown in Fig. 10. During the operation of the machine the needle and awl pass through openings in the presser foot and work support and through the edge of the bottom end closure and the web portion of the welt 132 between the bead of the welt and the line of connection between the welt and the side wall of the hassock casing. After the final closure seam has been inserted the bead of the welt 132, being under some lengthwise tension to enable it to fit snugly with the edge of the end closure, is allowed to slip off the edge of the end closure and swing against the side wall of the casing in such a way as to hide the exposed threads of the stitches inserted. In this way the seam is obscured and the only remaining exposed threads are hidden beneath the undersurface of the hassock.

Where the end closure is not made to fit snugly within the bead of the welt 132 it is desirable to guide the welt bead more accurately and the presser foot is provided with a downwardly extending fin 142 entering the space between the bead on the welt and the end closure 136. The fin 142 assists in confining the bead on the welt accurately and to insure a uniformly spaced connection between the bead on the welt and the edge of the bottom end closure. After the hassock end closure is sewn in this way the bead ordinarily will swing away from the end closure edge to hide the end closure stitches in the same manner as with a close fitting welt bead.

The hassock sewing machine of the present invention is not only simpler and easier to operate but actually produces a hassock of greater durability and more uniform construction in conformity with accepted standards than heretofore. Because the hassock is entirely filled with a preshaped wad of permanently compressed stuffing material before the flexible bottom end closure is fastened and the stuffing material is held compressed further during fastening, the effort required during the fastening operation on the part of the machine operator is greatly reduced. Furthermore, the fact that the parts of the flexible hassock casing are held with their edges in alinement throughout their entire lengths during the sewing operation is conducive to greater uniformity of tension in the completely fastened casing and to better retention of the original shape imparted to the hassock during subsequent use. By sewing a flexible hassock end closure to the edges of the flexible side walls while the end closure is held in flattened condition, the formation of wrinkles is avoided either during sewing or thereafter and irregular wear on the hassock casing along such wrinkles accordingly is prevented. Also by avoiding the use of relatively uncompressed stuffing material to finish out the incompletely filled hassock casing according to prior methods, permanent deformation of the hassock in use is avoided. Thus, the hassock retains indefinitely the original form of the highly compressed wad of stuffing material without subjecting the casing on the hassock to excessive tensions or looseness.

The nature and scope of the invention having been indicated and a particular embodiment having been described what is claimed is:

1. A machine for fastening hassock ends to the side walls of tubular casings while enclosing a compressed volume of stuffing material, having fastening devices, a fixed bracket and a movable hassock support on the bracket to facilitate presentation of a hassock to the fastening devices, in combination with clamping means in the support for holding the stuffing material in the hassock from endwise expansion to cause the edge of a hassock end to be brought into uniform alinement with the edge of the side walls before fastening, a vertical hinge mounting in the support for the clamping means to enable a hassock while held within the clamping means to be swung bodily toward and from the fastening devices, and a second vertical hinge mounting between the first hinge mounting and the bracket to enable movement of the hassock bodily in the direction of the line of the seam inserted by the fastening devices.

2. A machine for fastening hassock ends to the side walls of tubular casings while enclosing a compressed volume of stuffing material, having fastening devices, a fixed bracket and a hassock support to facilitate presentation of a hassock to the fastening devices, in combination with clamping means for holding the stuffing material in the hassock from endwise expansion to cause the edge of a hassock end to be brought into uniform alinement with the edge of the side walls before fastening, a vertical hinge mounting on the bracket for the clamping means to enable a hassock while held within the clamping means to be swung bodily toward and from the fastening devices, a second vertical hinge mounting between the first hinge mounting and the support bracket to enable movement of the hassock bodily in the direction of the line of the seam inserted by the fastening devices, and a releasable pin lock mounted for movement on the second hinge mounting for securing the second mounting in a position to bring a cylindrical hassock held in the clamping means into proper operating relationship to the fastening devices.

3. A machine for fastening stiffened hassock ends to beaded side wall margins of tubular casings while enclosing a compressed volume of stuffing material, having fastening devices and a hassock support to facilitate presentation of a hassock to the fastening devices, in combination with hassock side edge and end edge guiding means comprising a work table for deflecting the marginal portion of the hassock side wall edge against the substantially undeformed marginal portion of the end edge, and a presser foot having a fin arranged to enter the space between the end edge and the bead on the side wall edge while clamping the marginal portions of the edges together during insertion of the fastenings.

4. A machine for sewing hassock ends to beaded side wall margins of tubular casings while enclosing a compressed volume of stuffing material having stitch forming devices and a hassock support to facilitate presentation of a hassock to the stitch forming devices, in combination with hassock side edge and end edge guiding means for causing the stitches to be inserted close to the bead on the side wall margins comprising a work table for deflecting the marginal portion of the hassock side wall against the marginal portion of an end edge and a presser foot having a fin arranged to enter the space between the end edge and the bead on the side wall edge while clamping the marginal portions of the edges together during insertion of stitches.

5. A machine for fastening hassock ends to the side walls of tubular casings while enclosing a compressed volume of stuffing material, having fastening devices and a hassock support to facilitate presentation of a hassock to the fastening devices, in combination with a plate engaging a substantial area of the hassock end being operated upon to hold the stuffing material from endwise expansion, a C-shaped clamp for pressing the plate against the end of the hassock, and a jack screw rotatable in the clamp for supporting the clamp plate.

6. A machine for fastening hassock ends to the side walls of tubular casings while enclosing a compressed volume of stuffing material, having fastening devices and a hassock support to facilitate presentation of a hassock to the fastening devices, in combination with a plate engaging a substantial area of the hassock end being operated upon to hold the stuffing material from endwise expansion, a C-shaped clamp for pressing the plate against the end of the hassock, a jack screw rotatable in the clamp for supporting the clamp plate, and rack bar and pawl means in the clamp for applying a clamping pressure to the hassock.

OTTO R. HAAS.

References Cited in the file of this patent

UNITED STATES PATENTS

| Number | Name | Date |
|---|---|---|
| Re. 11,779 | Freschl | Oct. 24, 1899 |
| 80,619 | Ganiard | Aug. 4, 1868 |
| 86,744 | Ganiard | Feb. 9, 1869 |
| 807,451 | Fisher | Dec. 19, 1905 |
| 958,011 | Rothberg | May 17, 1910 |
| 1,062,564 | Donegan | May 20, 1913 |
| 1,488,334 | Frey | Mar. 25, 1924 |
| 1,592,293 | Brackett et al. | July 13, 1926 |
| 1,947,058 | Pittoni | Feb. 13, 1934 |
| 2,047,214 | McJoynt | July 14, 1936 |
| 2,063,520 | O'Brien | Dec. 8, 1936 |
| 2,185,827 | Avery | Jan. 2, 1940 |
| 2,214,586 | Isaacson | Sept. 10, 1940 |
| 2,238,773 | Haberstump | Apr. 15, 1941 |
| 2,307,430 | Thompson | Jan. 5, 1943 |
| 2,359,713 | Kessler | Oct. 3, 1944 |
| 2,449,017 | Smiler | Sept. 7, 1948 |